US011509599B1

(12) United States Patent
Nijim et al.

(10) Patent No.: US 11,509,599 B1
(45) Date of Patent: Nov. 22, 2022

(54) EDGE QUANTUM COMPUTING

(71) Applicant: Cox Communications, Inc., Atlanta, GA (US)

(72) Inventors: Yousef Wasef Nijim, Cumming, GA (US); Anthony Joseph Insinga, Powder Springs, GA (US); Joshua Paul Bernard Sommer, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/412,961

(22) Filed: Aug. 26, 2021

(51) Int. Cl.
*H04L 47/78* (2022.01)
*G06N 10/00* (2022.01)
*G06F 9/455* (2018.01)
*H04L 47/80* (2022.01)

(52) U.S. Cl.
CPC ........ *H04L 47/788* (2013.01); *G06F 9/45558* (2013.01); *G06N 10/00* (2019.01); *H04L 47/803* (2013.01); *G06F 2009/45575* (2013.01); *G06F 2009/45595* (2013.01)

(58) Field of Classification Search
CPC .................. H04L 47/788; H04L 47/803; G06F 2009/45575; G06F 2009/45595; G06F 9/45558; G06N 10/00
USPC ....................................................... 709/226
See application file for complete search history.

(56) References Cited

U.S. PATENT DOCUMENTS

| | | | | |
|---|---|---|---|---|
| 11,387,991 | B2* | 7/2022 | Rahman | H04L 9/0855 |
| 2022/0114469 | A1* | 4/2022 | Cruise | G06N 10/00 |
| 2022/0188680 | A1* | 6/2022 | Nation | G06F 8/41 |
| 2022/0215279 | A1* | 7/2022 | Rahman | G06F 8/41 |
| 2022/0216924 | A1* | 7/2022 | Rahman | G06N 10/00 |

* cited by examiner

*Primary Examiner* — Frantz B Jean
(74) *Attorney, Agent, or Firm* — Merchant & Gould P.C.

(57) ABSTRACT

Systems and methods are described for enabling quantum computing at an edge node of a network. For example, a machine learning component residing on each of a plurality of edge nodes of the network may be implemented to distribute application processing by network location and processing type, including distribution among classical processing at a central cloud, classical processing at an edge node, and quantum processing at a quantum edge node including a quantum computing device. By distributing certain applications, such as latency-sensitive applications of a higher order of complexity, to an edge node, and particularly a quantum edge node, latency may be reduced and complex application code may be processed more quicky using quantum computations. For applications to be processed using quantum processing, the machine learning component may further identify qubits for the quantum processing and define containers based on the qubits for deployment by the quantum computing device.

20 Claims, 8 Drawing Sheets

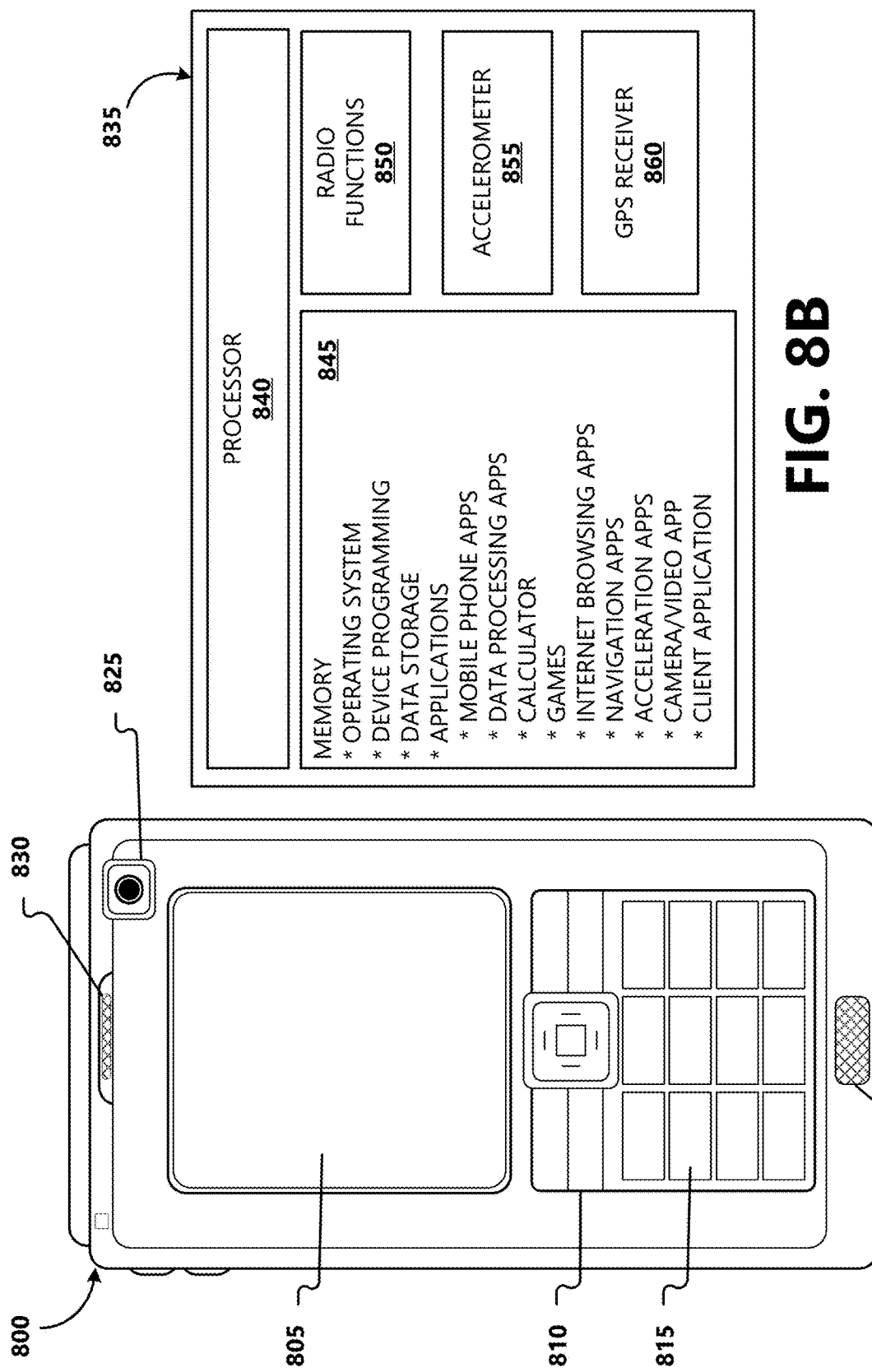

EDGE QUANTUM COMPUTING

BACKGROUND

Often, applications and optimizations of Internet of Things (IoT) devices, smart transportation, and smart cities are processed at a central cloud of a network using classical processing. With the exponential scaling of Internet of Things (IoT) devices, smart transportation, and smart cities causing an increase in the number and complexity of computations associated with the processing of the applications and optimizations, a processing time for performing these computations using classical processing will significantly increase. Additionally, the processing of these computations at the central cloud increases latency experienced by the applications, which may degrade the quality of the applications' performance as compared to if the applications were processed at a location in the network closer to the device running the application.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure provide for distribution of application processing by network location and processing type, and include at least a system, method, and computer readable storage device enabling quantum processing of an application at an edge node of a network as part of the distribution. For example, an indication may be received from an end device to process an application at a first edge node of a plurality of edge nodes within the network. A machine learning component executed at the first edge node may determine, based on a first set of rules, to process the application at one of the plurality of edge nodes rather than a central cloud of the network. The machine learning component may next determine, based on a second set of rules, to process the application using quantum processing at the edge node that is a quantum edge node having a quantum computing device. The machine learning component may then further identify qubits for the quantum processing of the application, and define one or more containers based on the identified qubits for deployment by the quantum computing device at the quantum edge node to process the application using the quantum processing. Performing the quantum processing of the application at the edge node rather than classical processing at the edge node and/or at the central cloud, may decrease latency and improves an accuracy of the computations.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 8A and 8B are block diagrams illustrating example physical components of a suitable mobile computing environment with which aspects of the present disclosure can be practiced.

DETAILED DESCRIPTION

Aspects of the present disclosure provide for distribution of application processing by network location and processing type. For example, an edge node of a network closest to an end device running an application may receive an indication to process the application. A machine learning component residing at the edge node may determine whether to process the application at one of the edge nodes in the network or a central cloud, and whether to process the application using classical versus quantum computing. Quantum processing may be enabled by a quantum computing device residing within at least one edge node of the network, also referred to herein as the quantum edge node. Based on rules implemented by the machine learning component, applications of certain types (e.g., latency-sensitive applications), applications of higher order of complexity, and/or specific device types running the application may trigger quantum processing of the application at the quantum edge node. When an application is determined to be processed at the quantum edge node using quantum processing, the machine learning component may further identify qubits for the quantum processing and define containers based on the qubits for deployment by the quantum computing device. By distributing more complex, latency-sensitive applications to the quantum edge node, latency may be reduced as the complex application code may be processed more quicky using quantum computations. Additionally, by distributing the applications by network location and processing type among classical computing at the central cloud, classical computing at an edge node, and quantum computing at an edge node, for example, network resources may be more evenly distributed or allocated improving a performance (including reduced latency) and bandwidth of the network as a whole.

Figure 1:
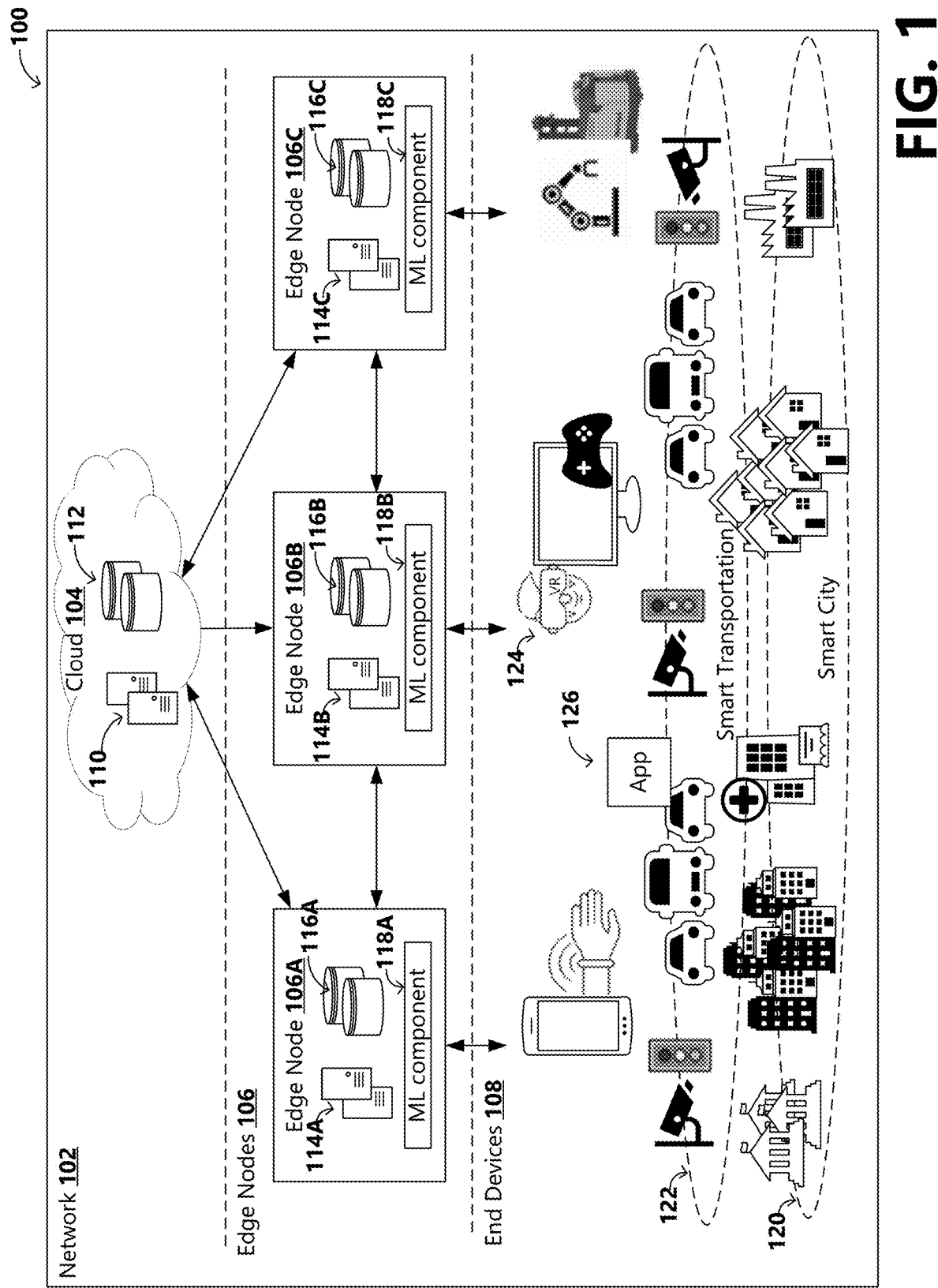
FIG. 1 is a block diagram of an example network environment in which a system of the present disclosure can be implemented.

FIG. 1 is a block diagram of an example environment 100 in which a system of the present disclosure can be implemented. As shown in FIG. 1, the example environment 100 includes a service provider network 102, referred to hereafter as network 102, comprising at least three layers. A first layer may include a central cloud 104, a second layer may include a plurality of edge nodes 106, and third layer may include a plurality of end devices 108.

The central cloud 104 may be a cloud computing environment having one or more servers 110 and one or more data stores 112 for data persistency that may be associated with or coupled to the servers 110. In some embodiments, the central cloud 104 may serve a primary role of data storage for the network 102. In other embodiments, (e.g., when network service is unavailable or significantly degraded via the edge nodes 106), the central cloud 104 may also provide services to the end devices 108, including processing of applications that are being run on the end devices 108. The central cloud 104 may be a private cloud, a public cloud, or a hybrid cloud.

The edge nodes 106 may be located at an edge of the network 102 closer to physical locations of the end devices 108 and provide edge computing functionalities. As illustrated, the plurality of edge nodes 106 may include a first edge node 106A, a second edge node 106B, and third edge node 106C. In other examples, the edge computing environment may include additional or fewer edge nodes 106.

Each of the edge nodes 106 may be a separate edge computing environment, having one or more servers 114A, 114B, 114C, collectively servers 114, and one or more data stores 116A, 116B, 116C, collectively data stores 116. At least a portion of the servers 114 may be classical computing devices capable of performing classical processing or classical computations. Classical computing may include computations based on or utilizing binary bits, fuzzy logic, or neural networks, among other examples.

Figure 2:
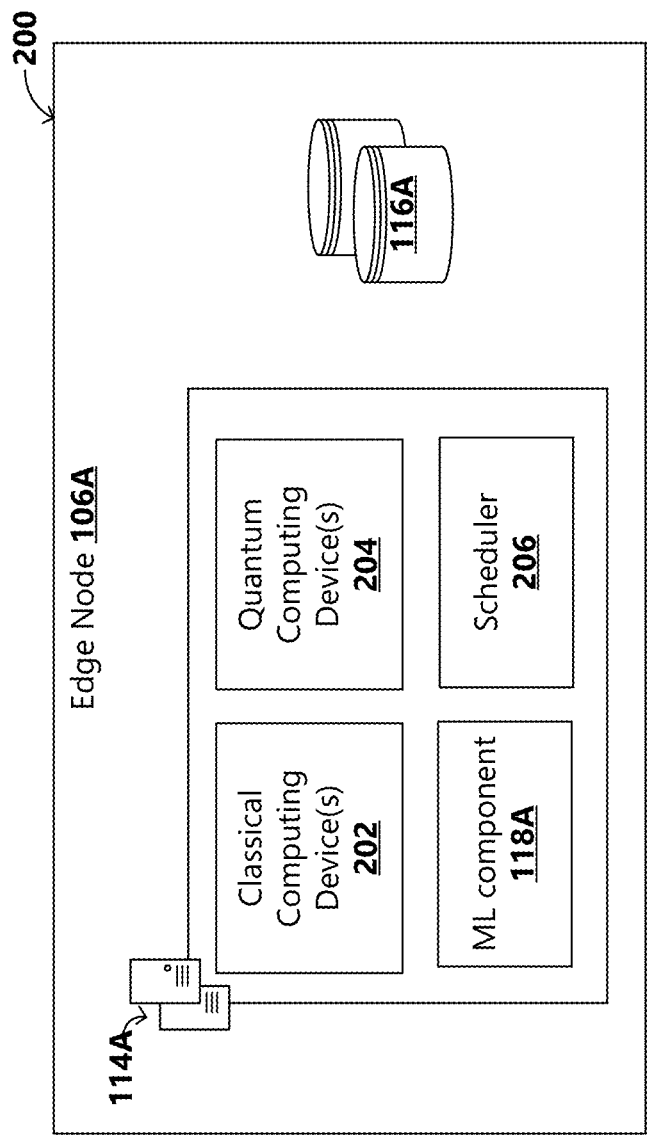
FIG. 2 is a block diagram illustrating an example quantum edge node.

As part of the separate computing environment, the edge nodes 106 may also include machine learning components 118A, 118B, 118C, collectively machine learning components 118. In some examples, at least one of the servers 114 at the respective edge nodes 106 may execute the machine learning components 118. Additionally, at least one of the edge nodes 106 may include a quantum computing device (e.g., at least one of the servers 114 may be a quantum server) and an associated scheduler for scheduling processes to be performed by the quantum computing device. The edge node 106 including the quantum computing device and the associated scheduler may be referred to as the quantum edge node. An example architecture of a quantum edge node is illustrated in FIG. 2 below.

Each one of the edge nodes 106 may be communicatively coupled to the central cloud 104 to allow communications to be sent to and received from the central cloud 104. Additionally, each one of the edge nodes 106 may be communicatively coupled to each other of the edge nodes 106 to allow communications to transmitted among the edge nodes 106.

The edge nodes 106 may serve a primary role of service provisioning to end devices 108 of users of the network 102. Provisioning of service by the edge nodes 106 may enable faster processing than if the service was provisioned by the central cloud 104 and thus results in reduced latency at the end devices 108. The users of the network 102 may be subscribers to various services, including edge services, provided by the service provider of the network 102. In some examples, when communicating with the edge nodes 106, an identifier associated with the end devices 108, such as a user account identifier, may be included within the communications such that the edge nodes 106 may recognize that the user account identifier is tied to a subscription to utilize the edge services of the service provider. In other examples, particular types of devices, such as devices manufactured by the service provider, may be automatically provisioned with the edge services via the edge nodes 106.

Edge nodes 106 may provide services to the end devices 108 via a cluster of entry points (not shown) associated with each edge node 106. One example entry point may include a Cable Modem Termination System (CMTS) located at a headend of a cable service provider. Other example entry points may include access points, bases stations, Radio Access Network (RAN), a radio network controller, a Passive Optical Network (PON), hot spots, small cells, data center, routers, switches, Wi-Fi access points, or a combination thereof. Each cluster of the entry points may be located within a particular geographical area, and thus the service coverage area of each of the respective edge nodes 106 may correspond to that particular geographical area. Accordingly, each edge node 106 may provide service to the portion of end devices 108 that are located within a same particular geographical area as the respective cluster of entry points for the edge node 106.

As an illustrative example, the first edge node 106A, the second edge node 106B, and the third edge node 106C may be servicing a city having a bounded geographical area. A first cluster of entry points may be located within a first portion of the geographical area of the city and thus the service coverage area of the first edge node 106A may be the first portion of the geographical area of the city. A second cluster of entry points may be located within a second portion of the geographical area of the city and thus the service coverage area of the second edge node 106B may be the second portion of the geographical area of the city. A third cluster of entry points may be located within a third portion of the geographical area of the city and thus the service coverage area of the third edge node 106C may be the third portion of the geographical area of the city.

The end devices 108 may include a plurality of different types of IoT devices, such as devices associated with smart cities 120, devices associated with smart transportation 122, and gaming-related devices 124, among other devices. Generally, IoT devices are able to access the network 102 and communicate data collected from embedded sensors and other technologies over the network 102. Example devices associated with smart cities 120 may include a plurality of different sensor types, such as biosensors, electronic sensors, chemical sensor, and smart grid sensors. Example devices associated with smart transportation 122 may include both mobile sensors integrated with vehicle systems and stationary sensors integrated into transport infrastructure (e.g., traffic lighting systems). Example gaming-related devices 124 may include computing systems and devices capable of running gaming applications, including virtual reality applications.

The end devices 108 may access the network 102 to run an application, such as an application 126 associated with Global Positioning System (GPS) technologies and/or light detection and ranging (LIDAR) scanning technologies being run by a computing system of an autonomous vehicle (e.g., a device associated with smart transportation 122). Initially, the vehicle may be in closest proximity with the first edge node 106A, and thus may access the network 102 via an entry point from the first cluster of entry points associated with the first edge node 106A. Accordingly, the first edge node 106A may receive an indication to process the application 126. For simplicity, one application is shown and used as an example herein. However, a large volume of applications may be concurrently run by a plurality of end devices within the same geographic area causing each edge node 106 to receive a corresponding large volume of indications to process the applications via the respective cluster of entry points.

Embodiments described herein are directed to distribution of application processing location and type by the machine learning components 118 at the edge nodes 106 upon the edge nodes 106 receiving indications from the end devices 108 to process the applications. For example, for each application, a machine learning component 118 may determine whether to process the application at the central cloud 104 or at the edge node 106. Additionally, the machine learning component 118 may determine whether to process the application using classical computing at the central cloud 104 or at the edge node 106, or process the application using quantum computing at the quantum edge node (e.g., the at least one edge node 106 including the quantum computing device). When multiple applications are to be processed at the same time, the processing can be done in parallel between the applications being processed at the central cloud 104 and the edge node 106. Similarly, classical processing and quantum processing at the quantum edge node may be performed in parallel. Applications, such as application 126 associated with GPS technologies and/or LIDAR scanning technologies, that have a high order of complexity and are latency sensitive may be more likely to be processed using quantum processing at the quantum edge node based on rules applied by the machine learning component 118. Performing the quantum processing of such applications at the quantum edge node rather than classical processing at the edge node 106 and/or at the central cloud 104, decreases latency and improves an accuracy of the computations.

FIG. 2 is a block diagram illustrating an example quantum edge node 200 such as the first edge node 106A of the network 102 described above with reference to FIG. 1. As previously discussed, each of the edge nodes 106 of the network 102 may include one or more servers 114, data stores 116, and a machine learning component 118. At least a portion of the servers 114, including the servers 114A of the first edge node 106A, may be classical computing devices 202 (e.g., classical servers), where at least one of the classical computing devices 202 may be capable of executing the respective machine learning component 118, such as machine learning component 118A of the first edge node 106A. Additionally, at least one of the edge nodes 106 within the network 102 may be a quantum edge node 200, such as the first edge node 106A. The servers 114 of the quantum edge node 200, such as the servers 114A of the first edge node 106A, may further include at least one server that is a quantum computing device 204 (e.g., a quantum server).

The quantum computing device 204 may be a quantum circuit model that use quantum physics and Hilbert space to identity quantum bits, hereafter qubits, for encoding information (e.g., application code) to be processed. In classical computing, information is encoded in binary bits, where each bit can have the value zero or one. In contrast, a qubit is a two-level quantum system, where the two basis qubit states may be $|0\rangle$ and $|1\rangle$, and the qubit may be in state $|0\rangle$, $|1\rangle$, or in a linear combination of both states referred to as a superposition of the $|0\rangle$ and $|1\rangle$ states.

The quantum edge node 200 may also include a scheduler 206 associated with the quantum computing device 204. In some examples, the scheduler 206 may be a component integrated within the quantum computing device 204. In other examples, the scheduler 206 may be a separate component that is communicatively coupled to the quantum computing device 204 and executed by one of the servers 114A. The scheduler 206 may schedule each of the applications to be processed by the quantum computing device 204. The scheduling may be automated based on priority criteria specified by the machine learning component 118A, where some processes or applications may have higher priorities than others. For example, processes of applications associated with smart cities 120, smart transportation 122, gaming 124, Internet of Things (IoT) devices, and energy savings may have higher priority than other application types.

Figure 3:
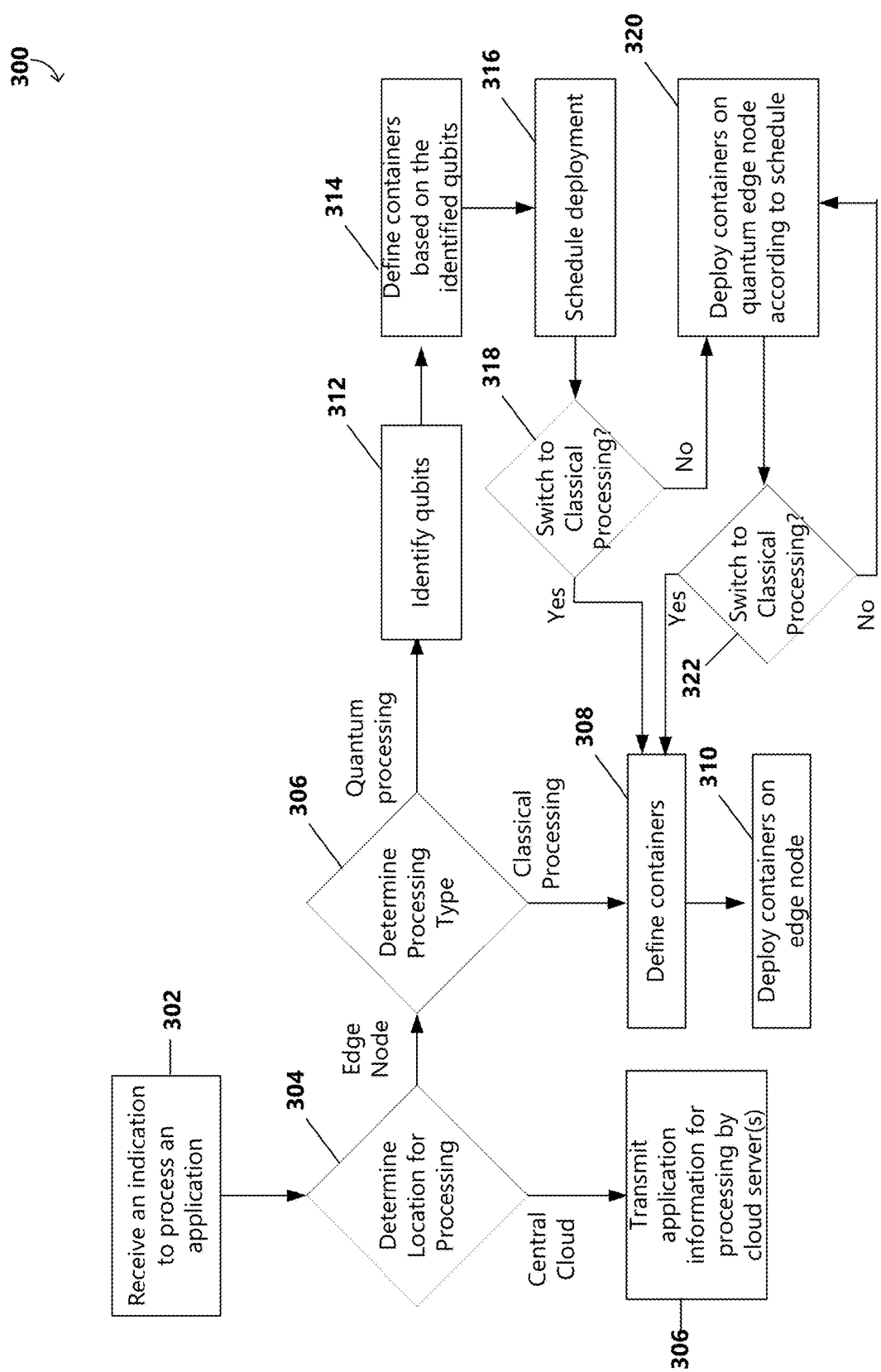
FIG. 3 is a flow diagram depicting general stages of an example method for determining a processing location and a processing type for an application according to an embodiment.

FIG. 3 is a diagram depicting general stages of an example process flow 300 for determining an application processing location and type. In some examples, the process flow 300 may be performed by at least one of the edge nodes 106 of the network 102 closest in proximity to an end device 108 that is accessing the network 102 to run an application on the end device 108.

The process flow 300 may begin at OPERATION 302 where an indication is received at the edge node 106 to process the application. The indication may include a communication from the end device 108 that is accessing the network 102 to run the application. A first set of rules may be applied at DECISION 304 to determine a location at which to process the application. For example, in some instances, based on the application of the first set of rules, the application may be determined to be processed at the central cloud 104. In other instances, based on the application of the first set of rules, the application may be determined to be processed at an edge node 106. In some examples, the first set of rules may be business rules specified by the service provider of the network 102. As described in more detail with reference to FIG. 4, example business rules may be associated with security, edge and cloud computation time, edge node interactivity, edge resource management, and data storage. The machine learning component 118 at the edge node 106 receiving the indication may apply the first set of rules at DECISION 304 to determine the processing location.

If at DECISION 304, the machine learning component 118 determines that the application is to be processed at the central cloud 104, the edge node 106 may transmit application information to the central cloud 104 for processing by the cloud servers 110. The application may be classically processed by the cloud servers 110.

If at DECISION 304, the machine learning component 118 determines that the application is to be processed at an edge node 106, a further determination may be made by the machine learning component 118 as to a processing type to be applied at the edge node 106 at DECISION 306. For example, in some instances, classical processing may be applied by at least one of the classical computing devices (e.g., classical servers) of the edge node 106 to process the application. In other examples, quantum processing may be applied by the quantum computing device 204 of the quantum edge node 200 to process the application. The DECISION 306 as to processing type may be based on a second set of rules. As described in more detail with reference to FIG. 5, the second set of rules may be based on a complexity of using quantum processing to process the application and a priority associated with the application. The complexity may be based on factors such as an estimated amount of time to perform a quantum computation to process the application and an estimated number of qubits to process the application.

If at DECISION 306, the machine learning component 118 determines to apply classical processing to process the application at the edge node 106, the same edge node 106 that received the indication to process the application (or another edge node if helpful for more balanced distribution of resources) may define containers at OPERATION 308 and deploy the containers on the edge node 106 at OPERATION 310. The containers may be executable units of software in which application code of the application is packaged, along with its libraries and dependencies, to allow execution of the application code upon deployment at the edge node 106.

If at DECISION 306, the machine learning component 118 determines to apply quantum processing to process the application at a quantum edge node 200, the machine learning component 118 may, at OPERATION 312, identify qubits, including a number thereof, to be run in Hibert space at an angle to process the application. The larger the number of qubits running in Hilbert space at an angle, the more complex the processing may be. Additionally, in quantum processing, there is convergence and divergence, where if a quantum computation reaches infinity per se, divergence may be occurring causing a high quantum processing error rate. Divergence may fail to produce desired results associated with the processing of the application, which wastes time and resources. Therefore, the lower the number of qubits, the more successful the optimization for the quantum computation may be, which results in greater likelihood in convergence and a faster the speed at which the quantum computation may proceed. The qubits may be identified based on a type of the application and/or a type of the end device running the application. Additionally, the qubits may be identified based on the number of edge nodes 106 involved from which data used for the quantum processing will be collected. Further, prior knowledge associated with qubits previously identified for the same or similar application types and/or same or similar the end device types may be used to identify or adaptively adjust the qubits.

At OPERATION 314, a plurality of containers may then be defined based on the identified qubits. The containers may be executable units of software in which application code of the application is packaged, along with its libraries and dependencies, to allow execution of the application code upon deployment by the quantum computing device 204 at the quantum edge node 200.

In some examples, regardless of whether the edge node 106 that receives the indication to process the application (e.g., the receiving edge node 106) is the quantum edge node 200, OPERATIONS 312 and 314 may be performed by the machine learning component 118 of the receiving edge node 106. The receiving edge node 106, if not the quantum edge node 200, may then transmit information associated with the application, including the identified qubits and defined containers, to the quantum edge node 200 for further processing. In other examples, when the receiving edge node 106 is not the quantum edge node 200, the receiving edge node 106 may transmit information associated with the application to the quantum edge node 200 and the machine learning component 118A of the quantum edge node 200 may perform OPERATIONS 312 and 314. In such examples, a determination of which node 106 (e.g., the receiving edge node 106 or the quantum edge node 200) is to run their respective machine learning component 118 to identify the qubits and define the containers may be based on a resource capacity of the respective nodes to provide optimized resource allocation across the edge nodes 106 of the network 102.

At OPERATION 316, a timing of the deployment of the containers by the quantum computing device 204 on the quantum edge node 200 may be scheduled by the scheduler 206 associated with the quantum computing device 204. For example, the containers may be positioned within a queue at the quantum computing device 204 based on a priority associated with the application.

In some examples, if there is a long queue at the quantum computing device 204, and thus a long wait time prior to the application being processing, the machine learning component 118 may determine, at DECISION 318, whether to abandon quantum processing and instead switch to and proceed with classical processing of the application by the classical computing devices 202 at one of edge nodes 106. For example, in response to a determination that the position of the one or more containers in the queue prevents the application from being processed within a predefined time period, the processing of the application using the quantum processing may be abandoned. If at DECISION 318, the machine learning component 118 determines to switch to classical processing, the containers may be removed from the queue at the quantum computing device 204, and the process flow diagram may proceed to OPERATION 308. If at DECISION 318, the machine learning component 118 determines to not switch to classical processing, the containers may be maintained within the queue at the quantum computing device 204 and the process flow 300 may proceed to OPERATION 320.

In other examples, OPERATION 316 may directly proceed to OPERATION 320. At OPERATION 320, once the containers reach a head or front of the queue, the containers may be deployed by the quantum computing device 204 at the quantum edge node 200 to process the application. For example, the quantum computation may be run on the containers. As the quantum computation is being run, if the quantum processing error rate is high due to no convergence occurring after a predefined time period has elapsed, the machine learning component 118 may determine, at DECISION 322, to abandon quantum processing and instead switch to and proceed with classical processing of the application by one of the classical computing devices 202 at one of the edge nodes 106. If at DECISION 322, the machine learning component 118 determines to switch to classical processing, the quantum computing device 204 may stop the running of the quantum computation, and the process flow 300 may proceed to OPERATION 308. If at DECISION 322, the machine learning component 118 determines to not switch to classical processing, the quantum computing device 204 may continue running the quantum computation. Once the quantum computation is finished (e.g., has converged), processing results may be returned to the end device 108.

In some examples, the DECISIONS 318 and 322 may be made by the machine learning component 118A of the quantum edge node 200. In other examples, the DECISIONS 318 and 322 may be made by the machine learning component 118 of the receiving node 106 that is not the quantum edge node 200. For instance, the quantum edge node 200 may transmit information to the receiving node 106 that indicates a position of the containers within the queue to be utilized by the machine learning component 118 of the receiving node 106 for DECISION 318. Similarly, the quantum edge node 200 may transmit information to the receiving node 106 that indicates a duration of the quantum processing and the quantum processing error rate to be utilized by the machine learning 118 of the receiving node 106 for DECISION 322.

Figure 4:
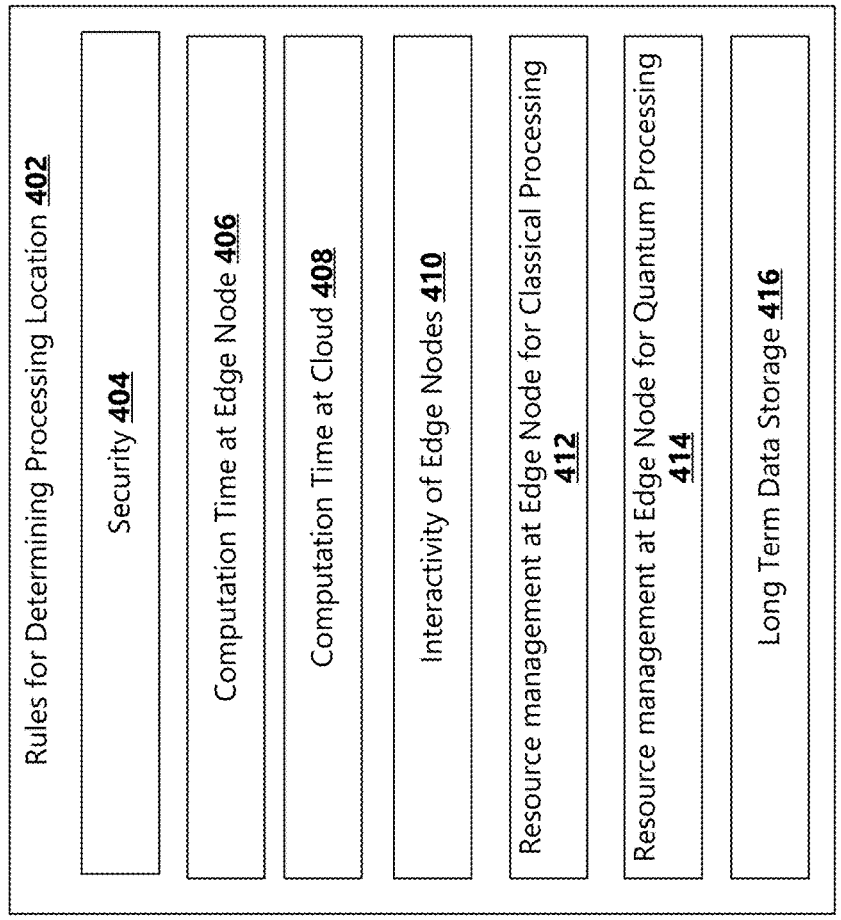
FIG. 4 is a block diagram illustrating example rules applied for determining a processing location for an application.

FIG. 4 is a block diagram 400 illustrating example rules 402 applied to determine a processing location for an application. For example, in response to an edge node 106 receiving an indication to process the application, the machine learning component 118 of the edge node 106 may apply the rules 402 to determine whether to process the application at the central cloud 104 or at one of the edge nodes 106 at DECISION 304 described with reference to FIG. 3. The rules 402 may be a first set of rules, including business rules, specified by a service provider of the network 102.

As one example, the rules 402 may consider a level of security 404 associated with the processing of the application. The level of security 404 may be based on a type of the application or a specific task of the application being requested for processing. For example, if the application handles sensitive or confidential information, the security level associated with the processing of the application may be enhanced. Generally, processing at one of the edge nodes 106 may provide a higher level of security than processing at the central cloud 104. Therefore, if the security level associated with the processing of the application is higher, the machine learning component 118 may push the determination toward the edge node 106 for this factor.

As another example, the rules 402 may consider a computation time for processing the application at an edge node 106 versus a computation time for processing the application at the central cloud 104. Generally, processing at the central cloud 104 may decrease a speed at which the processing results can be returned to the end device 108 due to the additional time required to transport the information pre-processing to the central cloud 104 and the results post-processing from the central cloud 104 to the end device 108. However, if the computation time for processing the application at the central cloud 104 is less than, equal to, or even only slightly longer than the computation time at the edge node 106, the machine learning component 118 may push the determination towards processing at the central cloud 104 if the speed will only be decreased by less than a threshold amount, for example, to conserve resources available at the edge node 106.

As a further example, the rules 402 may consider a level of edge node interactivity 410 needed to enable the processing of the application at one of the edge nodes 106. The level of edge node interactivity 410 may be based on an application type. For example, if the application is of a type that causes an edge node 106 to consume a large amount of resources when processing the application, a level of edge node interactivity 410 may be higher as at least a portion of the processing on the edge node 106 may be moved to another edge node 106 in the network 102 to prevent a resource capacity of the edge node 106 from being reached. One such example application type may be a gaming application that is highly sensitive to latency and involves computationally expensive processing. Additionally, the level of edge node interactivity 410 may be based on a location and/or a mobility of the device executing the application (e.g., end device 108). For example, if the device is highly mobile, such as a computing system of an autonomous vehicle, there may be greater interaction between edge nodes 106 as the device continuously moves away from a current edge node 106 and closer to a next edge node 106, and thus yielding a higher level of edge node interactivity 410. Also, the location of the device relative to the edge nodes 106, and particularly the location relative the quantum edge node 200, may affect the level of edge node interactivity 410. For instance, if the device is closest in proximity to an edge node 106 that is not the quantum edge node 200, a level of edge node interactivity 410 may be higher as information may need be transmitted between the edge node 106 and the quantum edge node 200 if quantum processing is later chosen as the type of processing for the application.

Additionally, the rules 402 may consider resource management for classical processing 412 as well as resource management for quantum processing 414 at the edge node 106. Resource management for each type of processing at the edge node 106 may include aspects related to resource allocation, workload balance, resource provisioning, task scheduling, and Quality of Service (QoS), for example. Therefore, if currently at the edge node 106, a large amount of resources have already been allocated to one or both of the classical computing devices for classical processing and a quantum computing device for quantum processing (e.g., there is a heavy workload with many tasks scheduled for processing), the machine learning component 118 may push the determination toward processing at the central cloud 104.

Further, the rules 402 may consider whether results of the processing of the application may need be stored in long-term data storage 418. Often, the central cloud 104 may have more robust long-term storage available. Therefore, if long-term storage of at least a portion of the results of the processing of the application may be desirable, the machine learning component 118 may push the determination toward the central cloud 104 for this factor.

In some examples, weights learned by (and adjustable by) the machine learning component 118 may be associated with one or more of the above-described rules 402. The weights may correspond to a criticality or importance of each of the respective rules 402 to the determination of processing location. As one illustrative example, the level of security 404 may be weighted more heavily than other rules.

The above-described rules 402 provide a non-limiting, non-exhaustive example of a set of rules that may be defined by the service provider for the network 102 for use by the machine learning component 118 in determining processing locations for applications. In other examples, fewer or additional rules of different types may be included in the set.

Figure 5:
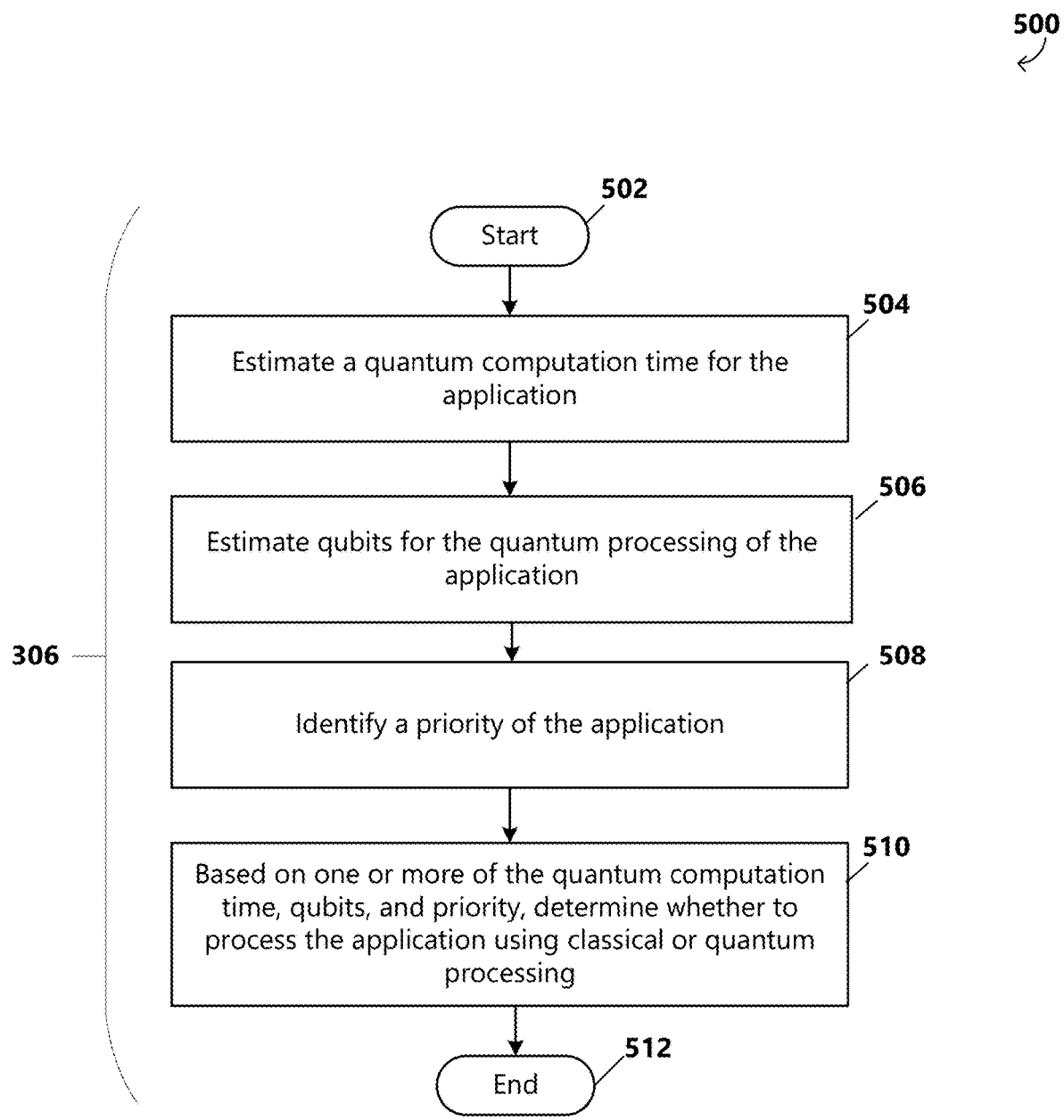
FIG. 5 is a flow diagram depicting general stages of an example method for determining a processing type for an application according to an embodiment.

FIG. 5 is a flow diagram depicting general stages of an example method 500 for determining a processing type for an application according to an embodiment. For example, in response to the machine learning component 118 determining to process the application at an edge node 106 at DECISION 304 based on the first set of rules 402, the machine learning component 118 may then apply a second set of rules to determine whether to process the application at the edge node 106 using classical or quantum processing at DECISION 306 described with reference to FIG. 3.

The second set of rules may be based on a complexity of using quantum processing to process the application and a priority associated with the application. The complexity may be based on factors such as an estimated amount of time to perform a quantum computation to process the application and an estimated number of qubits to process the application. The second set of rules applied may be exemplified by the method 500, and thus the method 500 can be used to at least partially perform the DECISION 306.

The method 500 begins at START OPERATION 502, and proceeds to OPERATION 504 where a computation time for processing the application using quantum processing (e.g., a quantum computation time) may be estimated. In some examples, the quantum computation time may be estimated based on historical data associated with quantum computation times of the application. In other examples, the quantum computation time may be estimated based on forecasted data associated with quantum computation times of the application. In further examples, the quantum computation time may be estimated based on a combination of the historical data and the forecasted data. Additionally, estimates may be based on historical data and/or forecasted data associated with quantum computation times of other application types similar to the application.

The method 500 then proceeds to OPERATION 506 where qubits, including a number thereof, for quantum processing may be estimated. The qubits may be estimated based on a type of the application and/or a type of the end device running the application. Additionally, the qubits may be estimated based on a number of edge nodes from which data used for the quantum processing will be collected. Further, prior knowledge (e.g., historical data associated with the qubits for quantum processing of the same or similar application types and/or end devices) may be used to identify or adaptively adjust the estimate. The lower the number of qubits and the least complex the qubits are, the more successful an optimization for a quantum computation may be, which results in greater likelihood in convergence and a faster the speed at which the quantum computation may proceed.

The method 500 next proceeds to OPERATION 508 where a priority of the application may be identified. In some examples, the priority is based on a type of application and/or a type of the end device running the application. More specifically, application or end devices types that are of a higher order of complexity or are latency-sensitive may be of higher priority.

The method 500 further proceeds to OPERATION 510 where based on at least one of the estimated quantum computation time, the estimated qubits, and the priority, a determination whether to process the application using classical or quantum processing is made. As one illustrative example, if the estimated quantum computation time and estimated number of qubits are relatively low (e.g., indicating a faster speed at which the quantum computation may proceed) and the priority of the application is relatively high (e.g., indicating a criticality of processing the application at the faster speed), then the machine learning component 118 may determine to process the application using quantum processing.

Once the determination on type of processing has been made, the method 500 ends at END OPERATION 512.

Figure 6:
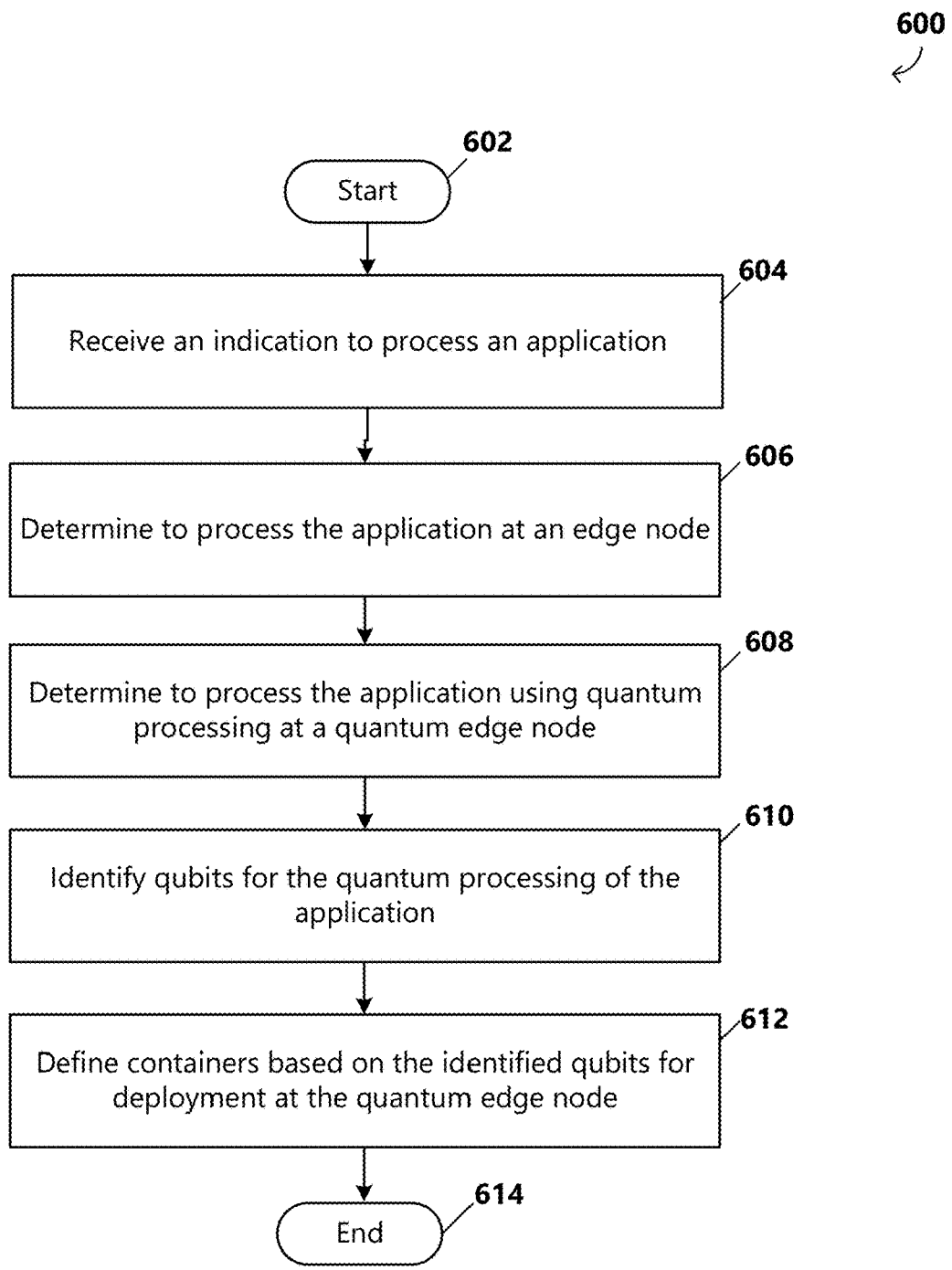
FIG. 6 is a flow diagram depicting general stages of an example method for processing an application using quantum processing at a quantum edge node of a network.

FIG. 6 is a flow diagram depicting general stages of an example method 600 for processing an application using quantum processing at a quantum edge node 200. In some examples, the method 600 may be performed by one or more components of one or more edge nodes 106 in the network 102.

The method 600 begins at START OPERATION 602, and proceeds to OPERATION 604 where an indication to process an application may be received. The indication may be a communication or a request from an end device 108 that is accessing the network 102 to run the application on the end device 108. The application may be a particular application type and the end device 108 may be a particular end device type. The indication may be received at an edge node 106 of the network 102 that is closest in proximity to the end device 108.

The method 600 proceeds to OPERATION 606, where a determination to process the application at an edge node 106 of the network 102 rather than the central cloud 104 may be made. In some examples, a machine learning component 118 of the edge node 106 at which the indication is received may determine the application processing location as the edge node 106 based on a first set of rules, such as the rules 402 described above in detail with respect to FIG. 4.

Based on the determination to process the application at an edge node 106, the method 600 may proceed to OPERATION 606, where a determination may be made to process the application using quantum processing at the quantum edge node 200 of the network 102, such as the first edge node 106A including the quantum computing device 204. The determination of processing type may be made using a second set of rules based on a complexity of the quantum processing and a priority of the application as exemplified by the method 500 described above with reference to FIG. 5. The determination may be made by the machine learning component 118 of the edge node 106 at which the indication is received. In some examples, the edge node 106 at which the indication is received may be the quantum edge node 200 (e.g., the first edge node 106A is the edge node 106 at which the indication is received). In other examples, the quantum edge node 200 that will perform the quantum processing is not the edge node 106 at which the indication is received, and therefore information associated with the application to be processed may be provided from the edge node 106 at which the indication is received to the quantum edge node 200 to enable the processing.

Based on the type of processing determined as being quantum processing at a quantum edge node, the method 600 proceeds to OPERATION 610, where qubits may be identified for the quantum processing of the application. The qubits may be identified based on the particular application type and/the particular end device type. Additionally, the qubits may be identified based on a number of edge nodes involved from which data used for the quantum processing will be collected. Further, prior knowledge associated with qubits identified for the same or similar application types run by the same or similar device types may be used to identify or adaptively adjust the qubits.

Once the qubits are identified, the method 600 proceeds to OPERATION 612, where one or more containers may be defined based on the identified qubits. The containers may include executable units of software in which application code of the application is packaged, along with its libraries and dependencies, to allow execution of the application code upon deployment at the quantum edge node.

In some examples, when the edge node 106 at which the indication is received (e.g., the receiving edge node 106) is not the quantum edge node 200, OPERATIONS 610 and 612 may be performed by the machine learning component 118 of the receiving edge node 106 and the resulting qubits and containers may be included as part of the information transmitted to the quantum edge node 200. Alternatively, the machine learning component 118A of the quantum edge node 200 may perform OPERATIONS 610 and 612 in response to receiving the information associated with the application to be processed from the edge node 106 at which the indication was received.

Once the containers are deployed at the quantum edge node 200, results of the application processing may be communicated back to the end device 108. If the quantum edge node 200 is a different edge node from which the indication to process the application was received and/or is not currently the closest edge node to the end device 108, the quantum edge node 200 may transmit the results of the application processing to that closest edge node 106 within the network 102, and that closest edge node 106 may communicate the results to the end device 108.

In some examples, a timing of the deployment of the containers may be based on a position of the containers in a processing queue at the quantum edge node 200. For example, the scheduler 206 associated with the quantum computing device 204 at the quantum edge node 200 may utilize a priority of the application to determine the position of the containers within the queue.

The method 600 then ends at END OPERATION 614.

Figure 7:
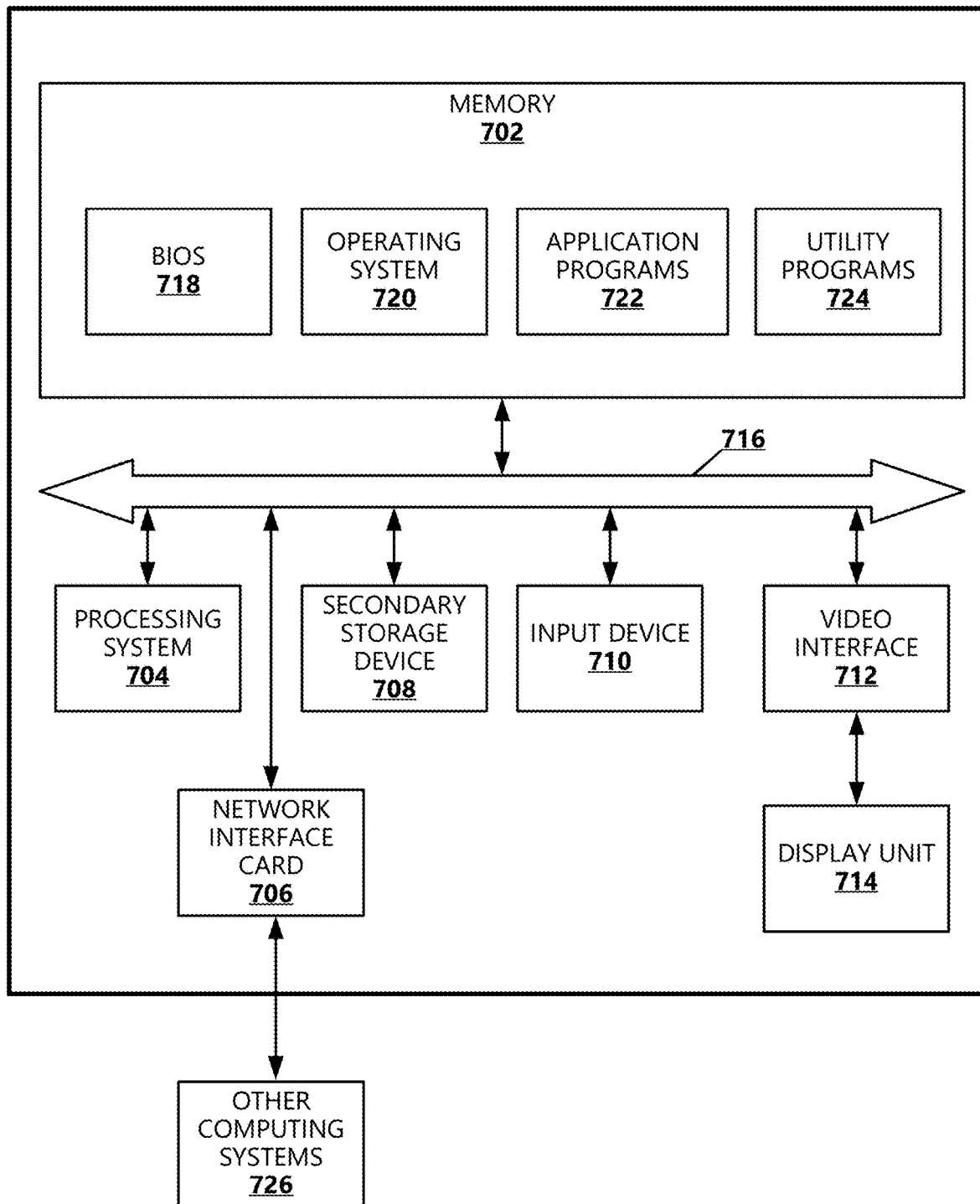
FIG. 7 is a block diagram illustrating example physical components of a computing device or system with which embodiments may be practiced.

FIG. 7 is a block diagram illustrating example physical components of a computing device 700 or system with which embodiments may be practiced, such as the servers 110 of the central cloud 104, the servers 114 of the edge nodes, and/or the end devices 108. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, cause allocation and/or reallocation operations as part of load balancing internal connections. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications (e.g., application 128) to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

FIGS. 8A-8B illustrate a suitable mobile computing device 800 or environment, for example, a mobile computing device or smart phone, a tablet personal computer, a laptop computer, or other end device 108, with which aspects can be practiced. The mobile computing device 800 is illustrative of any suitable device operative to send, receive and process wireless communications, as well as run applications (e.g., application 126). A display screen 805 is operative for displaying a variety of information such as information about incoming and outgoing communications, as well as, a variety of data and displayable objects, for example, text, alphanumeric data, photographs, and the like.

Data input to the mobile computing device 800 can be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device 800, or any other suitable input means. Data can be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 can be utilized for storing a device operating system, device programming, one or more stored applications, for example, mobile telephone applications, data processing applications, calculators, games, Internet browsing applications, navigation applications, acceleration applications, camera and/or video applications, client applications etc.

Mobile computing device 800 can contain an accelerometer 855 for detecting acceleration, and can be used to sense orientation, vibration, and/or shock. Mobile computing device 800 can contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the mobile computing device 800 to communicate with other communication devices and systems via a wireless network. Radio functions 850 can be utilized to communicate with a wireless or WIFI-based positioning system to determine a device location.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system enabling quantum computing at an edge node of a network, the system comprising:
a plurality of edge nodes, wherein each of the plurality of edge nodes comprises at least one processor, and a memory storage device storing instructions, including instructions for executing a machine learning component residing at each of the plurality of edge nodes, that, when executed by the at least one processor, cause the system to:
receive an indication from an end device to process an application;

based on a first set of rules, determine to process the application at one of the plurality of edge nodes rather than a central cloud of the network;

based on a second set of rules, determine to process the application using quantum processing at the one of the plurality of edge nodes that is a quantum edge node comprising a quantum computing device;

identify qubits for the quantum processing of the application; and define one or more containers based on the identified qubits for deployment by the quantum computing device at the quantum edge node to process the application using the quantum processing.

2. The system of claim 1, wherein the first set of rules are based on at least one of:
   a security level associated with the processing of the application;
   a computation time for processing the application at one of the plurality of edge nodes;
   a computation time for processing the application at the central cloud;
   a level of interactivity among the plurality of edge nodes to enable processing of the application at one of the plurality of edge nodes;
   resource management for classical processing at one of the plurality of edge nodes;
   resource management for quantum processing at the quantum edge node; and
   long term data storage associated with the processing of the application.

3. The system of claim 1, wherein the second set of rules are based on an estimated complexity of using the quantum processing to process the application and a priority of the application.

4. The system of claim 3, wherein the estimated complexity is based on an estimated quantum computation time for processing the application and an estimated number of qubits for the quantum processing.

5. The system of claim 4, wherein the estimated quantum computation time is based on at least one of historical data and forecasted data associated with the quantum processing of the application.

6. The system of claim 3, wherein the priority of the application is based on at least one of a type of the application and a type of the end device.

7. The system of claim 1, wherein the quantum edge node further comprises a scheduler associated with the quantum computing device.

8. The system of claim 7, wherein the scheduler determines a position for the one or more containers in a processing queue at the quantum computing device based on at least a priority of the application.

9. The system of claim 8, wherein in response to a determination that the position of the one or more containers in the processing queue prevents the application from being processed within a predefined time period, the processing of the application using the quantum processing is abandoned.

10. The system of claim 1, wherein subsequent to the deployment of the one or more containers and in response to determining no convergence is occurring after a predefined time period has elapsed, the processing of the application using the quantum processing is abandoned.

11. The system of claim 1, wherein the instructions that, when executed by the at least one processor, further cause the system to:
   receive a second indication from a second end device to process a second application;

based on the first set of rules, determine to process the second application at one of the plurality of edge nodes rather than the central cloud of the network;

based on the second set of rules, determine to process the second application using classical processing at the one of the plurality of edge nodes; and define one or more containers for the second application for deployment by a classical computing device at the one of the plurality of edge nodes to process the application using the classical processing.

12. The system of claim 1, wherein the instructions that, when executed by the at least one processor, further cause the system to:
   receive a third indication from a third end device to process a third application;
   based on the first set of rules, determine to process the application at the central cloud of the network; and
   transmit information associated with the application to the central cloud for processing by one or more servers of the central cloud.

13. A method for quantum computing at an edge node of a network, the method comprising:
   receiving, at a first edge node of a plurality of edge nodes within the network, an indication from an end device to process an application;
   based on a first set of rules, determining to process the application at one of the plurality of edge nodes;
   based on a second set of rules, determining to process the application using quantum processing at the one of the plurality of edge nodes that is a quantum edge node comprising a quantum computing device;
   identifying qubits for the quantum processing of the application; and
   defining one or more containers based on the identified qubits for deployment by the quantum computing device at the quantum edge node to process the application using the quantum processing.

14. The method of claim 13, wherein the first set of rules are based on at least one of:
   a security level associated with the processing of the application;
   a computation time for processing the application at one of the plurality of edge nodes;
   a computation time for processing the application at the central cloud;
   a level of interactivity among the plurality of edge nodes to enable processing of the application at one of the plurality of edge nodes;
   resource management for classical processing at one of the plurality of edge nodes;
   resource management for quantum processing at the quantum edge node; and
   long term data storage associated with the processing of the application.

15. The method of claim 13, wherein the second set of rules are based on at least one of:
   an estimated quantum computation time for processing the application;
   an estimated number of qubits for the quantum processing; and
   a priority of the application.

16. The method of claim 13, wherein the first edge node that receives the indication from the end device to process the application is the quantum edge node, and the method further comprises:

determining, by a scheduler of the quantum edge node, a position for the one or more containers in a processing queue at the quantum computing device; and deploying, by the quantum computing device at the quantum edge node, the one or more containers according to the position in the processing queue.

17. The method of claim 16, further comprising:

determining that the position of the one or more containers in the processing queue prevents the application from being processed within a predefined time period; and abandoning the processing of the application using the quantum processing.

18. The method of claim 16, further comprising:

subsequent to the deployment of the one or more containers and after a predefined time period has elapsed, determining no convergence is occurring; and abandoning the processing of the application using the quantum processing.

19. The method of claim 13, wherein a second edge node of the plurality of edge nodes is the quantum edge node including the quantum computing device, and the method further comprises:

transmitting, by the first edge node to the second edge node, information associated with the application, the information including the identified qubits and defined one or more containers.

20. A non-transitory computer readable storage device that includes executable instructions which, when executed by a processor, provide for quantum computing at an edge node of a network, the instructions comprising:

receiving, at a first edge node of a plurality of edge nodes within the network, an indication from an end device to process an application;

based on a first set of rules, determining to process the application at one of the plurality of edge nodes;

based on a second set of rules, determining to process the application using quantum processing at the one of the plurality of edge nodes that is a quantum edge node comprising a quantum computing device;

identifying qubits for the quantum processing of the application; and defining one or more containers based on the identified qubits for deployment by the quantum computing device at the quantum edge node to process the application using the quantum processing.

* * * * *